United States Patent
Rudolph et al.

(10) Patent No.: US 10,738,586 B2
(45) Date of Patent: Aug. 11, 2020

(54) METHOD FOR DEWATERING AND OPERATING COAL SEAM GAS WELLS

(71) Applicant: THE UNIVERSITY OF QUEENSLAND, St Lucia, Queensland (AU)

(72) Inventors: Victor Rudolph, St Lucia (AU); Mahshid Firouzi, St Lucia (AU); Brent Greenway, Milton (AU)

(73) Assignee: The University of Queensland, St Lucia, Queensland (AU)

( * ) Notice: Subject to any disclaimer, the term of this patent is extended or adjusted under 35 U.S.C. 154(b) by 0 days.

(21) Appl. No.: 16/434,906

(22) Filed: Jun. 7, 2019

(65) Prior Publication Data

US 2019/0284920 A1    Sep. 19, 2019

Related U.S. Application Data

(63) Continuation-in-part of application No. PCT/AU2017/051355, filed on Dec. 8, 2017.

(30) Foreign Application Priority Data

Dec. 9, 2016  (AU) ................................ 2016905097
Jun. 14, 2017  (AU) ................................ 2017902268

(51) Int. Cl.
| | | |
|---|---|---|
| *E21B 43/34* | (2006.01) |
| *E21B 43/32* | (2006.01) |
| *E21B 43/38* | (2006.01) |
| *C09K 8/594* | (2006.01) |
| *C09K 8/94* | (2006.01) |
| *E21B 43/12* | (2006.01) |
| *E21B 43/16* | (2006.01) |
| *E21B 43/25* | (2006.01) |
| *E21B 43/00* | (2006.01) |

(52) U.S. Cl.
CPC .............. *E21B 43/38* (2013.01); *C09K 8/594* (2013.01); *C09K 8/94* (2013.01); *E21B 43/006* (2013.01); *E21B 43/12* (2013.01); *E21B 43/122* (2013.01); *E21B 43/16* (2013.01); *E21B 43/25* (2013.01)

(58) Field of Classification Search
CPC ...... E21B 43/128; E21B 17/025; E21B 36/00; E21B 43/122; E21B 43/2406; E21B 47/12; E21B 43/006; E21B 43/121
See application file for complete search history.

(56) References Cited

U.S. PATENT DOCUMENTS

| | | |
|---|---|---|
| 4,756,367 A | 7/1988 | Puri et al. |
| 5,339,905 A | 8/1994 | Dowker |
| | (Continued) | |

OTHER PUBLICATIONS

International Search Report for PCT/AU2017/051355, dated Feb. 27, 2018, 6 pages.

*Primary Examiner* — Zakiya W Bates
(74) *Attorney, Agent, or Firm* — Nixon & Vanderhye P.C.

(57) ABSTRACT

A method for removing water from a coal seam gas well or shale gas well, the coal seam gas well or shale gas well including an outer casing into which coal seam gas and water flow near the lower region of the coal seam gas well, the method includes delivering pressurized methane into a lower region of the gas well, the pressurized methane acting to lift water from the lower region of the gas well, and cause it to flow upwards towards the surface. A system is also provided for removing water from a coal seam gas well or shale gas well. The method may be retro-fitted to existing CSG wells or shale gas wells.

26 Claims, 8 Drawing Sheets

(56) References Cited

U.S. PATENT DOCUMENTS

| | | |
|---|---|---|
| 6,382,321 B1 | 5/2002 | Bates et al. |
| 2005/0183859 A1 | 8/2005 | Seams |
| 2014/0190691 A1 | 7/2014 | Vinegar et al. |
| 2014/0262292 A1 | 9/2014 | Joseph et al. |

METHOD FOR DEWATERING AND OPERATING COAL SEAM GAS WELLS

This application is a Continuation-in-Part of International Application No. PCT/AU2017/051355 filed 8 Dec. 2017, which designated the U.S. and claims priority to AU Patent Application No. 2016905097 filed 9 Dec. 2016, and AU Patent Application No. 2017902268 filed 14 Jun. 2017, the entire contents of each of which are hereby incorporated b reference.

TECHNICAL FIELD

The present invention relates to a method for dewatering and operating coal seam gas wells

BACKGROUND ART

Natural gas has historically been produced from conventional oil wells or conventional gas wells. In conventional oil wells, the well is drilled into the earth and lined with an outer casing. An inner production tubing is inserted through the outer casing. Oil enters into the production tubing and is raised to the surface through the production tubing. If natural gas is entrained with the oil, it is separated from the oil at the surface and either captured for sale or disposed of. Gas lift or bubble pumps raise fluid such as oil through the incorporation of bubbles of compressed gases such as air, water vapour or other gases thereby reducing the density of the gas/liquid mixture relative to liquid only and carrying liquid oil out of the wellbore. The purpose of gas lift in oil production is to move the oil liquid to the surface for production when the reservoir pressure is insufficient to do so.

In more recent times, coal seam gas has become a significant production source for natural gas. Coal seam gas (CSG) is predominantly methane. CSG collects in underground coal seams by bonding to the surface of coal particles. The coal seams in many coal reservoirs are water saturated and the pressure of the water keeps the gas adsorbed on the surface of the coal.

In order to produce coal seam gas, a well is drilled into a coal seam and an outer casing is used to line the well. The outer casing is arranged so that fluids can enter it from the reservoir, e.g. by having perforations in it in the vicinity of the coal seam. Inner tubing is inserted through the casing. Coal seam gas flows into the outer casing and flows upwardly through the annulus between the outer casing and the inner tubing.

In order for a water saturated well to start producing it is often necessary to initially remove a large portion of the water. This "dewatering" results in a lowering of the reservoir pressure to a point whereby desorption of the methane from the coal surface occurs at a substantial rate. Long periods of dewatering may be required before gas production reaches a maximum rate.

Similar wells are used to produce gas from other non-conventional sources, such as gas from shale and gas from shale oil.

Artificial lift systems such as pumps are used for dewatering. Progressive Cavity Pumps (PCPs) are commonly used for dewatering gas wells due to their ability to pump water which may contain particulate content, such as suspended sand from hydraulic fracturing, coal or soil particles, and dissolved solids. PCP installations typically include a pump motor installed on the wellhead which is connected to a bottom-hole pump by way of a drive rod extending though the production tubing. However, there are significant disadvantages with PCP systems, including, importantly, High costs associated with pump maintenance or replacement, since the pumps must be withdrawn from the well. Performance issues and maintenance arises from:
  Stator failures as a result of fatigue, wear and fluid incompatibility issues etc.
  Rotor failures as a result of wear, heat cracking, fatigue issues etc.
  Rod string failure as a result of fatigue, excessive torque issues etc. and
  Tubing string failures as a result of wear and corrosion issues etc.

Further operational factors that impact the performance of a PC Pump system are:
  Overheating as a result of gas entering the pump causing elastomers to swell and overheat;
  Solids which cause plugging;
  Incorrect operation of the pump outside of the recommended parameters which are determined by the well characteristics;
  Extended periods of inactivity or 'dry well' conditions;
  Costly work-overs due to failed, malfunctioning or end-of-life PC Pumps; and
  PCPs cannot be easily controlled in terms of rotation speed, thereby having a direct impact on variable flow rates.

It is generally held that gas lift is unsuitable for coal seam gas wells because the intent of the well is to produce gas and not recover liquid as in the case of oil recovery. Introducing additional gas into the well from the surface does not facilitate the transport of gas up the well, or the production of additional gas from the reservoir, and has the significant disadvantage of introducing unwanted diluents such as nitrogen or steam into the produced gas which reduces its value. For these reasons, gas lift is nowhere applied to the recovery of coal seam gas.

As mentioned above, to produce the gas from a coal seam gas formation it is necessary to reduce the pressure in the well so as to induce desorption of the methane from coal and cause it to flow into the well. The reduction in pressure requires the removal of water from the coal seam and that water also flows into the outer casing of the well. Much of this water disengages from the gas under gravity and collects at the bottom of the well and submersible mechanical pumps are typically used to pump the water up through the inner tubing so that it can be removed from the well. It will be understood that if excess water builds up in the bottom of the well, the hydrostatic pressure will tend to suppress the flow of coal seam gas from the coal seam into the well.

Significant solid fines and particulate material are also produced in coal seam gas wells and these tend to flow into the well with the water that flows into the well. This results in a build-up of fines/particulates/solids within the well, which can block the flow of water from the well and also cause significant wear and maintenance issues with the mechanical pumps.

As can be seen, production of coal seam gas requires primary and ongoing dewatering of the wells, which incurs significant costs. Current mechanical lift pumps, which are located at the bottom of the coal seam gas wells, are prone to failure from gas interference and fines production, resulting in high downtime and maintenance costs.

It will be clearly understood that, if a prior art publication is referred to herein, this reference does not constitute an admission that the publication forms part of the common general knowledge in the art in Australia or in any other country.

SUMMARY OF INVENTION

It is an object of the present invention to provide a method for applying gas lift to gas wells, such as coal seam gas wells or shale gas wells, that increases value and avoids or overcomes or ameliorates in part or in full the obstacles and disadvantages described above or provides the consumer with a useful or commercial choice. In some embodiments, the present invention provides a method for applying foam assisted gas lift to coal seam wells.

With the foregoing in view, the present invention in one form, resides broadly in a method for removing water from a gas well, the gas well including an outer casing into which gas and water flow near the lower region of the gas well, the method comprising delivering pressurised methane into a lower region of the gas well, the pressurised methane acting to lift water from the lower region of the gas well, and cause it to flow upwards towards the surface.

Using methane as the vapour component in the present invention avoids the problem of contaminating or diluting the coal seam gas with unwanted constituents.

Throughout this specification, the term "methane" will be used to refer to both pure methane and natural gas, which is predominantly methane but may contain some other gaseous components as well.

In one embodiment, the water is separated from the methane at the surface. In one embodiment, the methane that is separated from the water comprises methane that has been delivered into the gas well and methane produced in the gas well.

In one embodiment, at least part of the methane that is separated from the water is returned to the lower region of the gas well as pressurised methane.

In one embodiment, the gas well includes inner tubing and methane and water are removed by gas lift or, in some embodiments, foam assisted gas lift through the annulus between the outer casing and the inner tubing. In this embodiment, the mechanical lift pump may still be operated to provide additional water removal through the inner tubing.

In another embodiment, the gas well comprises an outer casing with no inner tubing.

In one embodiment, pressurised methane is delivered into the gas well via a tube or pipe that extends to the gas injection position or positions in the lower region of the gas well. In some embodiments, pressurised methane is delivered into the gas well via a tube or pipe that extends through a volume defined by the outer casing or via a tube or pipe extending along an outside part of the outer casing.

In one embodiment, pressurised methane is provided by passing methane to a compressor and increasing pressure of the methane in the compressor, and subsequently delivering the pressurised methane to the lower region of the gas well.

In one embodiment, pressurised methane is delivered to a region that is located below a level of water accumulated in the lower region of the gas well.

In embodiments of the present invention, delivery of the pressurised methane to the lower regions of the gas well acts to provide foam assisted gas lift. As the gas expands as it rises up the column or bore of the well, a foam is formed and bubbly or foamy flow causes the combined fluid density to be reduced as the gas-liquid mixture approaches the surface. For brevity and convenience of description, the gas-liquid mixture will be referred to throughout this specification as a foam.

In some embodiments of the present invention, one or more additives may be added in order to assist in forming a stable foam. The one or more additives are suitably environmentally acceptable and benign with respect to downstream operations, particularly with respect to downstream operations that treat the water removed from the coal seam gas well. It will be understood that most water that is removed from the coal seam gas well is quite salty and treatment methods include pumping the produced water to salt ponds or pans for evaporation or treatment of the produced water by passing it through a reverse osmosis plant to produce a purified water stream and a concentrated brine stream. If additives are used to assist in producing a stable foam in the column of the well, those additives should not adversely affect, for example, operation of a reverse osmosis plant. A variety of additives suitable for this purpose have been identified in the literature. The skilled person would be readily able to ascertain suitable additives to use in this regard.

In one embodiment, the additive comprises a salt or a salt solution. In one embodiment, the additive comprises a concentrated brine solution recovered from treatment of water produced from a coal seam gas well, for example, a concentrated brine solution recovered from a reverse osmosis treatment of water produced from the coal seam gas well.

In other embodiments, the additives may comprise one or more surfactants. The one or more surfactants may be biodegradable and non-toxic. The one or more surfactants may comprise one or more sulphonate surfactants.

Advantageously, the gas lift, such as the foam assisted gas lift that occurs in the method of the present invention also acts to raise solid fines or solid particulates from the lower region of the well. Advantageously, the solid fines or solid particulates act as a stabilising component of the foam and therefore also assist in maintaining a stable foam in the column of the gas well. Once the solid fines and solid particulates have been raised to the surface, they can be separated from the gas and liquid fractions using conventional solid separation technology. As this separation step is occurring on the surface, it can be better operated and controlled than any similar processes that may take place at the lower region of the well.

Also, foam assisted gas lift eliminates opportunity for methane leakage at the wellhead, since it eliminates the need for dynamic seals against rotating or moving shafts necessary for PCPs or rod pumps, in embodiments of the invention where PCPs or rod pumps are not used.

In some embodiments, well bottom hole pressure is controlled by actively and dynamically managing the foam density. Bottom hole pressure (BHP), which is an important control factor influencing gas production, mainly depends on the liquid head in the well column, which in the present invention is largely set by the foam density. Foam density may be controlled by controlling the liquid to gas ratio in the well by, as examples, adjusting the amount of pressurised methane that is delivered to the lower region of the well or by the use of additives.

In coal seam gas wells and shale gas wells, the lower the bottom hole pressure the better from the perspective of rate of gas production from the well. However, from a reservoir perspective, the overall production from the wells are set so that the gas production rate matches that which is required (and which may fluctuate according to demand, contractual issues such as pre-booked access to pipelines, and others).

Typically, the production rates from some wells in the reservoir are throttled, which effectively means the bottom hole pressure rises and the gas release rate into those wells is reduced. In practice, the gas flow rate can vary from zero to the maximum that the well can deliver. In the latter case, the bottom hole pressure is set by the gathering pipe pressure on the surface plus the pressure loss in the well which is mainly caused by the fluid head. Consequently, for mechanical pumping there is an incentive to reduce the water level as low as possible increasing the risk of introducing gas into the pump, which is detrimental to the pump. In the present invention, it is desirable that one would want the largest L:G ratio that can be achieved and still have foam.

The ratio of liquid to gas (L/G) in a coal seam gas well or shale gas well that is operated without foam assisted gas lift varies greatly during the life of the well. At the beginning of operation, a coal seam gas well will typically only produce water, meaning that the L/G ratio is very high (almost infinite), with the L/G ratio decreasing as gas starts to be produced.

In embodiments of the present invention, the L/G ratio following methane injection into the well may fall within the range of from 0.005 to 0.3, or from 0.025 to 0.25. It is believed that a L/G ratio of about 0.25 will produce a dense foam in the well. In some embodiments, the present invention also includes controlling the L/G ratio in the well to a desired level.

In some embodiments, the method of the present invention further comprises measuring bottom hole pressure in the lower region of the well and controlling bottom hole pressure to a value within a desired range.

The method of embodiments of the present invention also includes the step of separating the water from the gas. This gas-liquid separation may occur at the surface. Conventional gas-liquid separation technology may be used, examples of which including mechanical, acoustical and chemical methods are described in the literature. For example, an ultrasonic separator may be used to break the foam and hence separate the gas from the liquid. In other embodiments, the gas-liquid mixture may be fed to a tank for storage, during which the foam will naturally break. As a further alternative, the gas-liquid mixture may be fed to a region of low pressure, for example in a cyclone or the suction of a modified pump, which will cause the gas to burst from the foam to thereby break the foam. In other embodiments, the foam is broken by chemical means. For example, a chemical that causes the foam to break may be added to the foam.

Once the gas has been separated from the liquid, it may move to a gas storage tank, a gas treatment process or to a gas delivery pipeline. In embodiments where the pressurised methane that is provided to the lower region of the well comprises gas recovered from the well, at least part of the gas that is separated from the liquid is fed to the compressor so that it can be pressurised and delivered to the lower region of the well.

In some embodiments, a plurality of gas wells provide the gas-liquid mixture or gas-liquid-solids mixture to relevant separation equipment in which the solids and liquids are separated from the gas. Some of the gas may be provided to a compressor and the compressor may deliver pressurised methane to at least some or all of the plurality of gas wells. In this manner, the number of compressors required will be minimised. Control of the flow rate of methane that is delivered to each of the coal seam gas wells may be achieved by providing a control valve in each pipeline that connects each coal seam gas well to the compressor.

In some embodiments, separation equipment is provided at the surface and the separation equipment receives the gas-liquid mixture or gas-liquids-solids mixture from a plurality of coal seam gas wells. Again, this reduces the number of separation units required to break the foam and/or separate solids and liquid from the gas.

The method of the present invention may be used in existing gas wells, including coal seam gas wells and shale gas wells, in which mechanical pump artificial lift systems are used. In such embodiments, the foam assisted gas lift system of the present invention may be used to reduce the amount of pumping that is required from the mechanical pumps or to maintain production of the well whilst the mechanical pump has been removed for maintenance or servicing. In embodiments where the method of the present invention is used whilst the mechanical pump lift system is still in place, gas and water are removed from the coal seam gas well via the annulus between the pump tubing/string and the outer casing of the well.

The method of the present invention may also be used in new coal seam gas wells and shale gas wells. In these embodiments, it will not be necessary to insert a pump tubing/string into the well. As a result, it may be possible to form a smaller diameter well than would otherwise be required if the well had to also be large enough to receive a pump tubing/string. Thus, the cost involved in drilling a well may be decreased as a smaller diameter well can be formed, which will have lower drilling costs and lower casing costs.

The present invention also relates to a system for removing water from a gas well. Accordingly, in a second aspect, the present invention provides a system for removing water from a gas well, the gas well including an outer casing into which gas and water flow near the lower region of the coal seam gas well, the system comprising delivery means for delivering pressurised methane into a lower region of the gas well, the pressurised methane acting to form a foam, the foam rising up through the gas well to thereby lift water from the lower region of the coal seam gas well.

In one embodiment, the system further comprises separating means for receiving the foam and separating water from methane.

In an embodiment the gas compressor is the gas compressor as described for the system according to the first or second aspects above, having had the inlet and outlets reversed, or the connecting tubes re-routed.

Preferred features of the system of the second aspect of the present invention may be as described with reference to the method of the first aspect of the present invention.

In accordance with a third aspect there is provided a dewatering system for a gas well, such as a coal seam gas (CSG) well or shale gas well having a wellhead, production tubing surrounded by a production casing and which tubing and casing are both in fluid communication with a coal seam reservoir in which water collected at the bottom interferes with gas extraction, the system comprising: a gas compressor having an outlet in fluid communication with the production casing and being operable to inject compressed produced gas into the production casing, such that injection of the compressed produced gas travelling down the production casing forces produced gas into the production tubing thereby reducing the hydrostatic fluid column pressure within the production tubing and in turn causing a co-mingled solution or mixture of produced water and gas to travel up the production tubing for separation and transfer.

In an embodiment the co-mingled solution/mixture of produced water and gas is delivered to a separator apparatus for separating the produced water from the gas and wherein the gas compressor is fluidly coupled to the gas separator for receiving a portion of the separated gas for compression and subsequent re-injection into the casing. The gas compressor may, for example, be a reciprocating compressor.

In an embodiment, during an initial stage of dewatering during which time there is minimal availability or no ability to extract produced gas, the gas compressor is operable to inject gas supplied independently of the CSG well or shale gas well. The gas supplied independently of the CSG well or shale gas well may be an inert gas suitable for use with the CSG well or shale gas well dewatering process, such as nitrogen. In another embodiment, the gas supplied independently of the CSG well may be methane.

In an embodiment the gas compressor is configured to be fluidly coupled to one or more portable inert gas quads, bullets, or the like for receiving the inert gas.

In accordance with a fourth aspect there is provided a dewatering system for a CSG well or shale gas well having a wellhead, production tubing and production casing and wherein the tubing and casing are both in fluid communication with a coal seam reservoir or shale gas reservoir in which water saturation interferes with gas extraction, the system comprising: a gas injection tubing located inside the production tubing and which extends substantially the length thereof; a gas compressor having an outlet in fluid communication with the gas injection tubing and being operable to inject compressed produced gas into the gas injection tubing, such that injection of the compressed produced gas upon exiting the end of the gas injection tubing into the production tubing creates a pressure reduction in the hydrostatic fluid column pressure within the production tubing, in turn causing a co-mingled solution or mixture of produced water and gas to travel up the production tubing for further separation and transfer. This process in turn causes produced water and gas to move towards the production casing and production tubing for extraction as part of the natural migration process associated with dewatering of CSG wells or shale gas well. The co-mingled solution or mixture of produced water and gas may be in the form of a foam.

In an embodiment the co-mingled solution/mixture of produced water and gas is delivered to a separator apparatus for separating the produced water from the gas and wherein the gas compressor is fluidly coupled to the separator for receiving a portion of the separated produced gas for compression and subsequent injection into the production casing. The gas compressor may, for example, be a reciprocating compressor.

In an embodiment, during an initial stage of dewatering during which time there is minimal availability or no ability to extract produced gas, the gas compressor may inject a gas supplied independently of the CSG well or shale gas well. The gas supplied independently of the CSG well or shale gas well may be an inert gas suitable for use with the CSG well or shale gas well dewatering process, such as nitrogen. In another embodiment, the gas supplied independently of the CSG well or shale gas well may be methane.

In an embodiment the gas compressor is configured to be fluidly coupled to one or more portable inert gas quads, bullets or the like for receiving the inert gas.

In accordance with a fifth aspect there is provided a method of retro-fitting a CSG well or shale gas well with a pre-existing pump drive apparatus for gas extraction with a dewatering system, the method comprising: removing a pump drive unit of the pre-existing pump drive apparatus from the well head; installing a gas compressor such that a compressed gas outlet is in fluid communication with a production casing of the CSG well or shale gas well, the gas compressor being operable to inject compressed gas into the production casing, such that produced gas travelling down the production casing forces produced gas into the production tubing thereby reducing the hydrostatic fluid column pressure within the production tubing, in turn causing a co-mingled solution or mixture of produced water and gas to travel up the production tubing for further separation and transfer. The co-mingled solution or mixture of produced water and gas may be in the form of a foam.

In an embodiment the method further comprises coupling a compressed gas outlet of the gas compressor to a connection on the wellhead previously utilised for extracting produced gas from the production casing.

In an embodiment the method further comprises coupling a connection on the well previously utilised for extracting produced water from the production tubing to a separator.

In accordance with a sixth aspect of the present invention there is provided a method of retro-fitting a CSG well or shale gas well with a pre-existing pump drive apparatus for gas extraction with a dewatering system, the method comprising: removing a pump drive unit of the pre-existing pump drive apparatus from the well head; removing a drive rod of the pre-existing pump drive apparatus, if fitted; installing a gas injection tubing inside production tubing connected to the well head, the gas injection tubing extending substantially the length of the production tubing; installing a gas compressor such that a compressed gas outlet is in fluid communication with the gas injection tubing, the gas compressor being operable to inject compressed produced gas into the gas injection tubing, such that injection of the compressed produced gas upon exiting the end of the gas injection tubing into the production tubing creates a pressure reduction in the hydrostatic fluid column pressure within the production tubing, in turn causing the co-mingled solution or mixture of produced water and gas to travel up the production tubing for further separation and transfer. The co-mingled solution or mixture of produced water and gas may be in the form of a foam.

In accordance with a seventh aspect there is provided a method of optimising an underperforming CSG gas well or shale gas well with minimal produced water content but with low produced gas pressure or low produced gas flow characteristics having a production tubing surrounded by a production casing and which tubing and casing are both in fluid communication with a coal seam reservoir, comprising: implementing a gas compressor such that a gas inlet is in fluid communication with the production casing and being operable to extract produced gas and/or water from the production casing to improve produced gas pressure and flow rates. The co-mingled solution or mixture of produced water and gas may be in the form of a foam.

In an embodiment the method further comprises routing the produced gas and/or water flow through a water trap/knock-out drum prior to entering the gas compressor.

In all aspects of the present invention, the co-mingled solution or mixture of produced water and gas may be in the form of a foam.

The present invention can be used in coal seam gas wells, shale gas wells, shale oil gas wells, and indeed in any unconventional gas wells or non-conventional gas wells, or gas wells that require hydraulic fracturing/fracking to produce gas.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

The skilled person will appreciate that the attached drawings have been provided for the purposes of illustrating preferred embodiments of the present invention. Therefore, it will be understood that the present invention should not be considered to be limited solely to the features as shown in the attached drawings.

The attached drawings relate to embodiments of the present invention as used with coal seam gas wells. However, the embodiments shown in the attached drawings are equally applicable to shale gas wells and shale oil gas wells.

Figure 1:
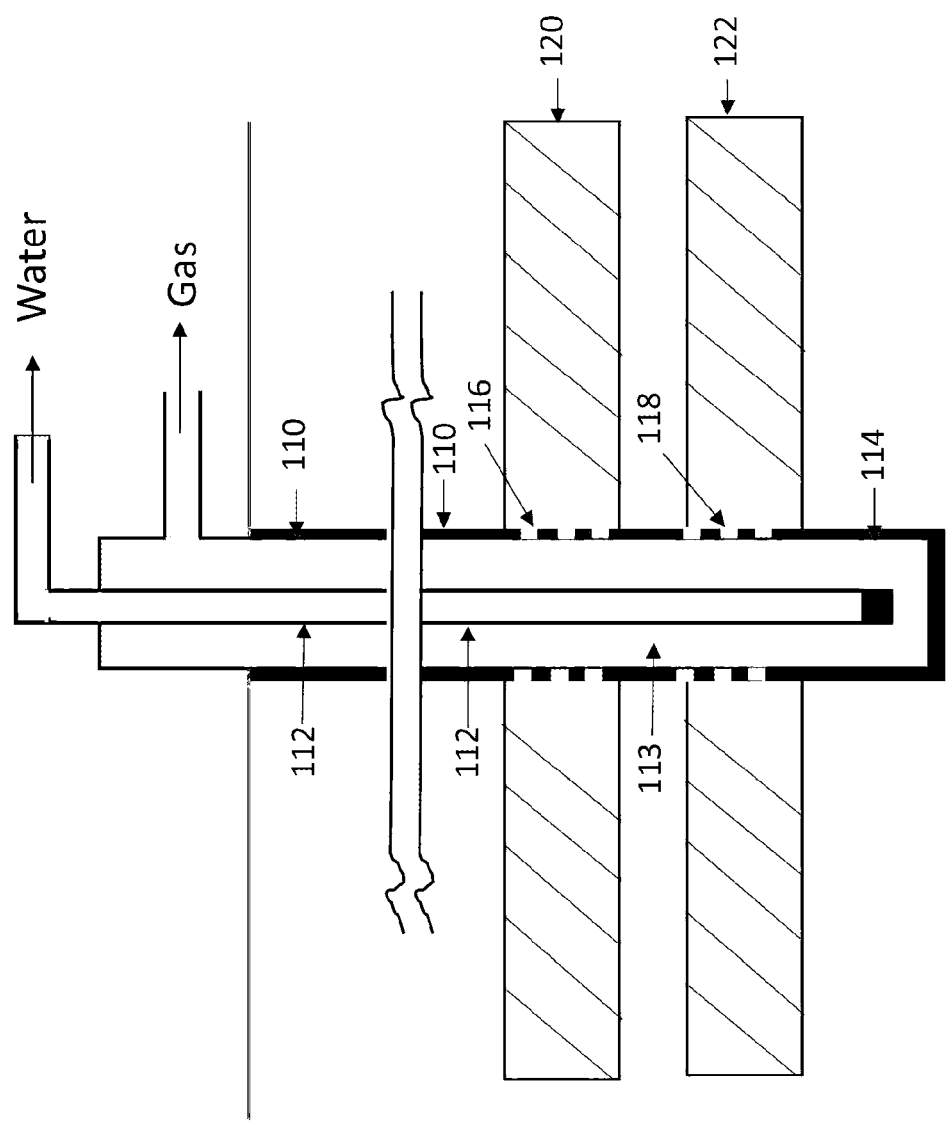
FIG. 1 shows a schematic diagram of a conventional coal seam gas well using a mechanical pump as an artificial lift system.

FIG. 1 shows a schematic diagram of a conventional coal seam gas well. In FIG. 1, an outer casing 110 lines a bore of the well. An inner pump string 112 is inserted through the outer casing 110. A submersible mechanical lift pump 114 is positioned at or near the bottom of the pump string 112. The outer casing 110 includes perforations 116, 118 in the vicinity of coal seams 120, 122. In operation of the well shown in FIG. 1, gas and water flow from the coal seams 120, 122 through perforations 116, 118 and into the outer casing of the well. The gas rises upwardly in the annulus 113 between the outer casing 110 and the pump string 112. Some of the water disengages from the upwardly rising gas and falls under gravity to the bottom of the well. Operation of mechanical lift pump 114 causes the water to be pumped up to the surface through the inside of pump string 112.

CSG wells produce a significant amount of water, which varies through the life of the well. Generally, in CSG wells, the gas flows upwards and the liquid downwards in the annulus (to be extracted by the pump at the bottom of the well). The flow regime critically affects the well pressure profile and consequently the gas production. Counter-current flows may not exist at high gas: liquid flow ratios due to flow reversal (flooding) where liquid flow is (partially) carried upward by the high gas flow rate. This condition may represent a major part of the operating life of the well. The foam assists in advancing flooding (free flow) by reducing the required gas velocity to carry the liquid up to the surface.

Figure 2:
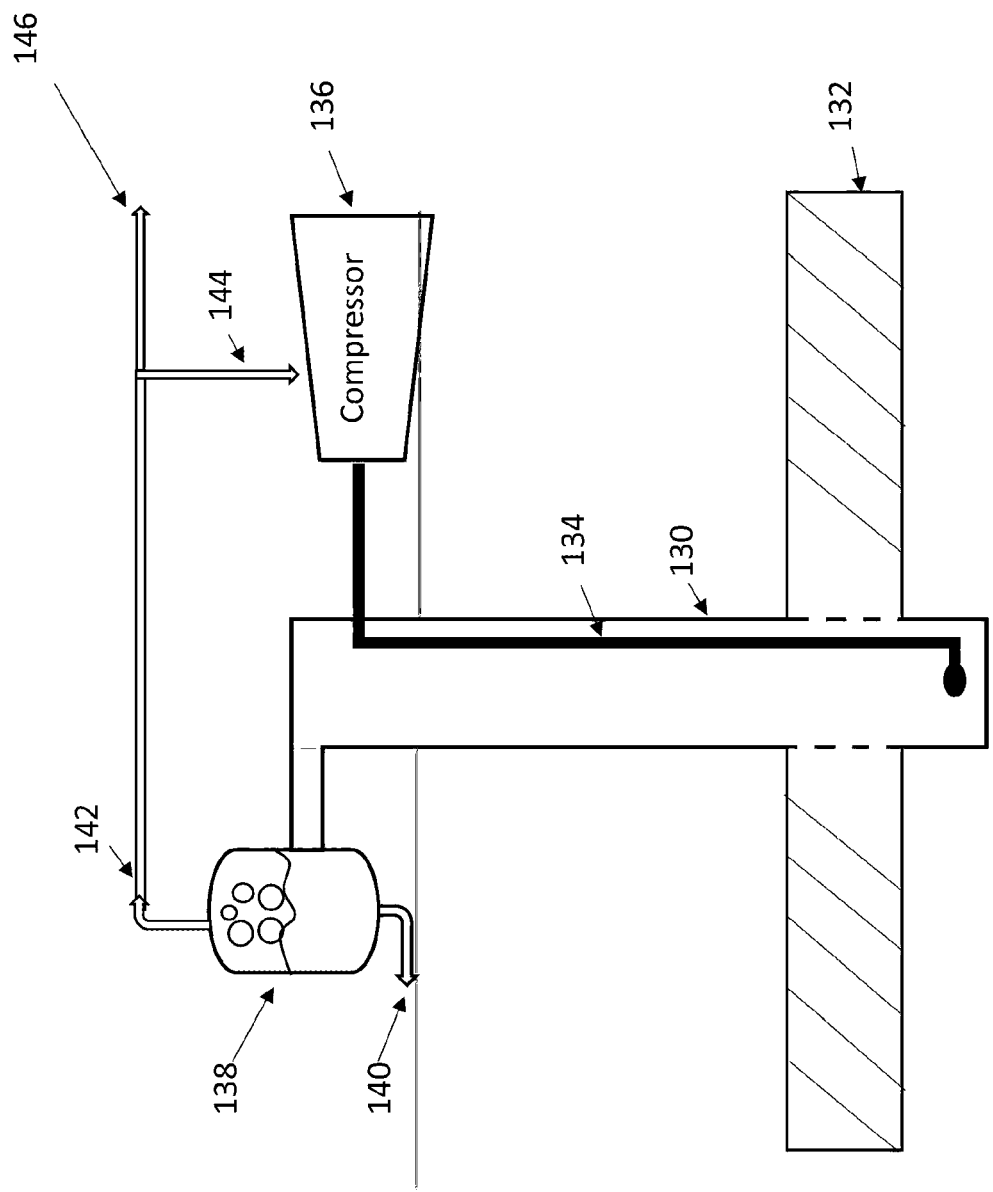
FIG. 2 shows a schematic diagram of a coal seam gas well in which gas and water are delivered to the surface using an embodiment of the present invention.

FIG. 2 shows a schematic diagram of a coal seam gas well operated in accordance with the present invention. In FIG. 2, an outer casing 130 lines the bore of the well. The bottom of the well extends into or through a coal seam 132. The outer casing 130 is open to the coal or provided with perforations so that gas and water from the coal seam 132 can flow into the well. In operation, solids, in the forms of fines or particulates, will also flow into the well. A pipe 34 extends from a compressor 136 to injection point or points near the base of the well. The pipe 134 delivers compressed and pressurised methane from compressor 136 to the injection point or points near the base of the well 130. Methane is injected so that the volumetric L/G ratio at the bottom of the well is reduced, for example to about 0.1. The pressure at the bottom of the well will depend upon the depth of the well.

Injection of the pressurised methane to the base of the well results in the formation of a foam. In order to increase the stability of the foam, one or more additives may be added to the well. A separate injection pipe may be used to supply the one or more additives. Alternatively, the one or more additives may be injected with the methane through pipe 134. In one embodiment, a concentrated brine may be injected as an additive to enhance the stability of the foam. The concentrated brine may be recovered from a treatment process that is used to treat water removed from the CSG well. Foam creation will normally require the vigorous introduction of gas into an impure liquid. Foam formation and stability is controlled by a three-stage process consisting of foam drainage caused by gravity, coarsening caused by the gas transfer between bubbles induced by capillary pressure difference, and bubble coalescence caused by the thinning and rupture of liquid films between bubbles. Inorganic salts promote foaming and inhibit bubble dissipation above a critical concentration. The critical concentration is dependent upon the type of salt(s) present. For example, for NaCl, the critical concentration is around 100 mM and this concentration of NaCl may advantageously be naturally present in the formation water produced in the well from the coal seam. However, it may also be desirable to add additional salt(s) to the well in some embodiments. In some embodiments, the present invention also comprises the steps of determining the critical salt concentration for maintaining a stable foam and adding one or more additives. This may also require that the water produced from the coal seam be analysed to determine its salt concentration and then determining how much additive to add to the well to obtain a concentration at or above the critical salt concentration. The gas within the foam and the pressure may also play roles in foam quality. In some embodiments, it is possible that the water produced in the coal seam gas well will have sufficient salt content to assist in forming a stable foam, or additional salt may need to be added, typically in the form of a salt solution.

As fines/particulate material also move into the CSG well, the fines/particulate material become trapped in the foam. Advantageously, fines in CSG water tended to act as foam stabilisers, possibly by adsorbing at the gas-water interface and reducing the free energy of the system, preventing bubble coalescence and impeding the coarsening process through adsorbing at the gas-water interface. In coal seam gas wells in Queensland, the fines are predominantly interburden clay particles and have a particle morphology, size and hydrophobicity that should be stabilising to foams.

The foam that is formed at the bottom of the well then moves upwardly through the column of the well due to pressure differences between the bottom of the well and the top of the well. As the foam rises up through the column of the well, the pressure in the well reduces and this causes the foam to expand and the L/G ratio in the foam to decrease. It will be appreciated that the foam consists of methane injected into the bottom of the well via the compressor, gas produced in the well, water produced in the well and any fines that are trapped in the foam.

Once the foam has reached the surface, it passes into a separator 138. The separator 138 breaks the foam and forms a water stream 140 and a gas stream 142. Water stream 140 also includes fines and particulates that are raised to the surface with the foam. The water stream 140 may be sent for further treatment, for example, to remove fines and particulates therefrom and then to further treatment to remove salt therefrom. Alternatively, the liquid may be pumped to a tailings dam or to an evaporation pond. Other treatments for the water stream may also be used.

Part of the gas stream 142 is recycled via line 144 to the compressor 136. The other part of gas stream 142 is sent via line 146 to a gas storage facility or a gas treatment facility, or to a gas pipeline. The gas flowing through line 146 represents the produced gas from the CSG well.

It will be appreciated that the compressor 136 may be used to provide pressurised methane to a number of CSG wells. For example, pressurised methane from the compressor 136 may be fed to a manifold, with a plurality of supply pipes then feeding the pressurised methane to respective ones of a number of CSG wells. Similarly, the separator 138 may receive produced foam from a number of different CSG wells and subsequently break the foam and separate the gas from the water and fines. The separator may use any suitable known separation technology that can break foams and separate liquids from gases.

Figure 3:
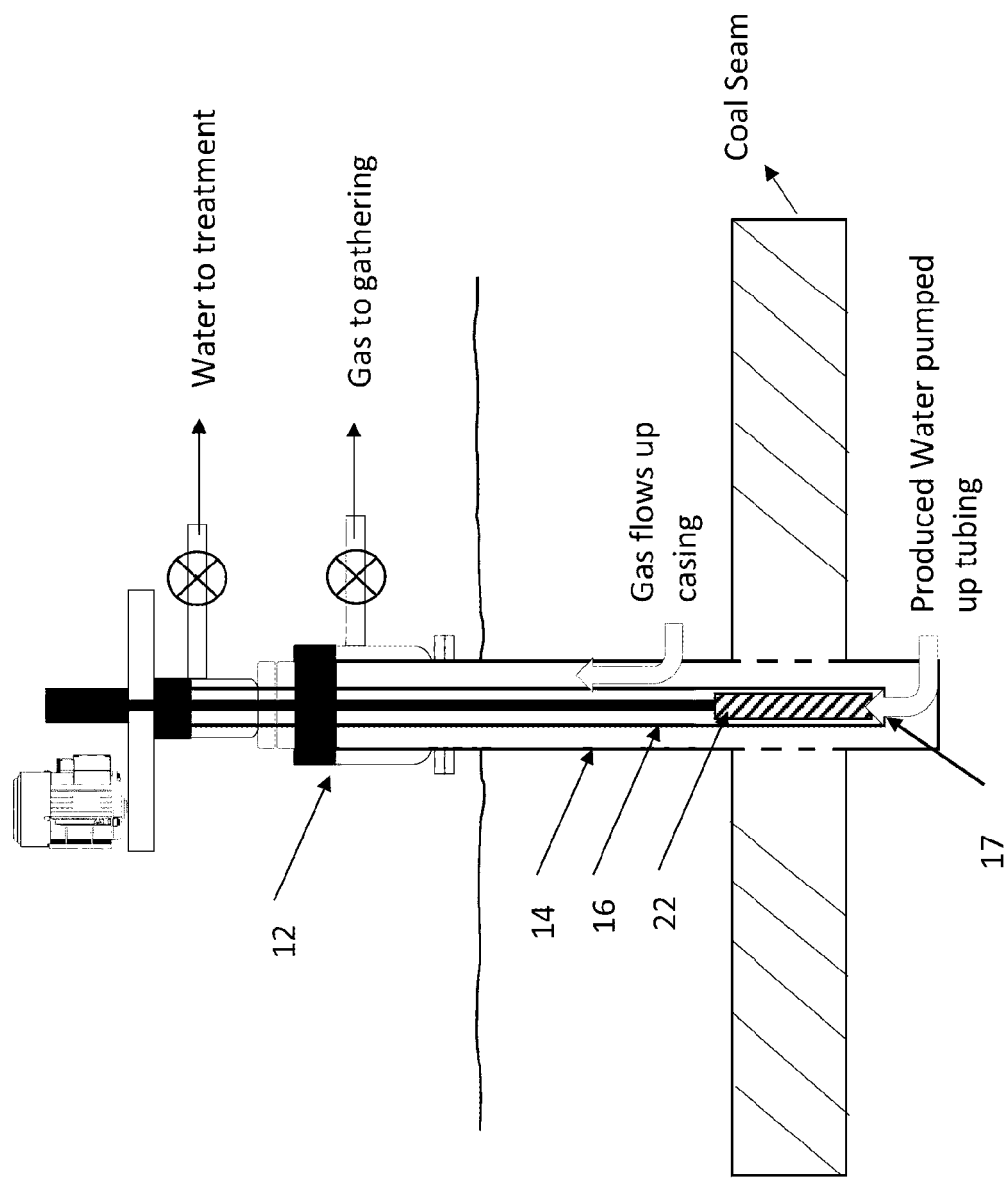
FIG. 3 is a schematic of a CSG well with a conventional PCP installation for dewatering.

The embodiment of the present invention shown in FIG. 3 is particularly suited for use with water saturated CSG wells. The depth of the wells may be from 200 to 2000 m, although the skilled person will understand that the depth of the well may vary. As shown, the CSG well incorporates a wellhead 12 in fluid connection with a production casing 14. The down-hole arrangement typically consists of production tubing 16 that extends axially through the production casing 14, at least to a depth where an opening is in fluid communication with a reservoir formation 17 and where a co-mingled solution or mixture of produced water and gas is 'lifted' to the surface through the action of a downhole pump assembly in a process known as 'dewatering'. The above-ground arrangement typically consists of the wellhead connected to discharge lines to deliver produced water to a suitable water treatment plant and the produced gas to the gas gathering facility or a comingled solution or mixture to a suitable separator located in the immediate vicinity of the wellhead.

Figure 4:
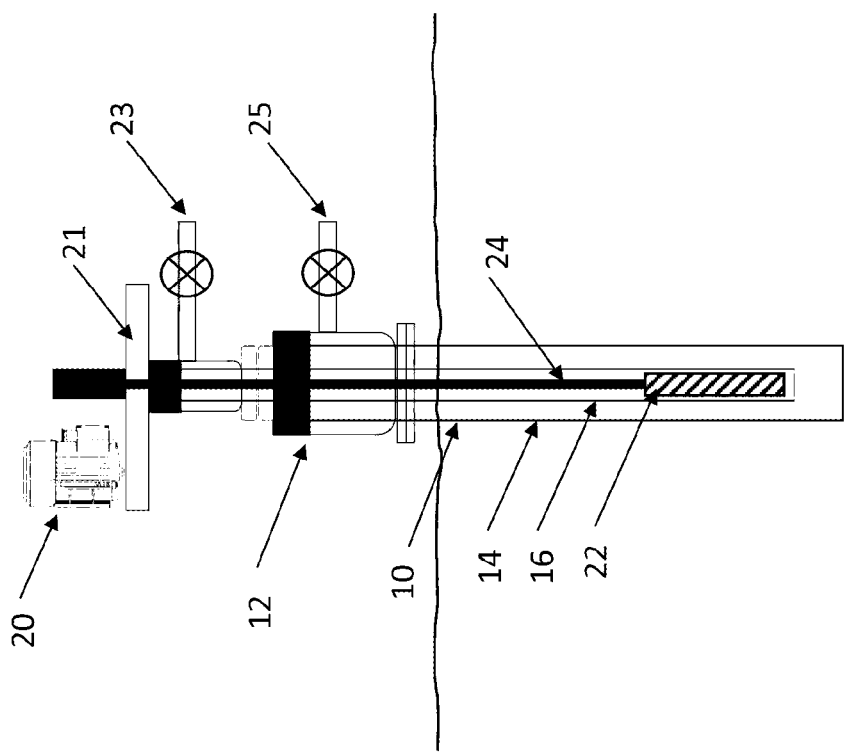
FIG. 4 is a close-up of the well head of FIG. 3.

With additional reference to FIG. 4, the CSG well 10 incorporates a dewatering system in the form of a conventional Progressive Cavity Pump (PCP). The PCP dewatering system comprises an electric motor 20 incorporated into a pump drive head 21 disposed on top of the wellhead 12. The electric motor 20 is operable to drive a PCP 22 located at or near the bottom of the production tubing 16, connected by a pump drive rod 24. More specifically, the electric motor 20 is configured to drive the PCP 22 by way of a pump drive rod 24 which is disposed inside of the production tubing 16. Water pumped up through the production tubing 16 exits through a produced water outlet 23, while produced gas (i.e. released from the seams) exists though a produced gas outlet 25.

Embodiments of the present invention may be retro-fitted to the wellhead 12 of FIG. 4 for replacing the PCP dewatering system with a foam assisted gas lift dewatering system, as will now be described. The foam assisted gas lift dewatering system can be installed with little modification to the existing CSG well 10 configuration and advantageously employs re-circulated produced gas from the separating arrangement 30 (FIG. 5) to kick-off the dewatering process. Alternatively, the foam assisted gas lift dewatering system may be employed with new CSG wells or existing CSG wells that are not fitted with any form of dewatering system.

Figure 5:
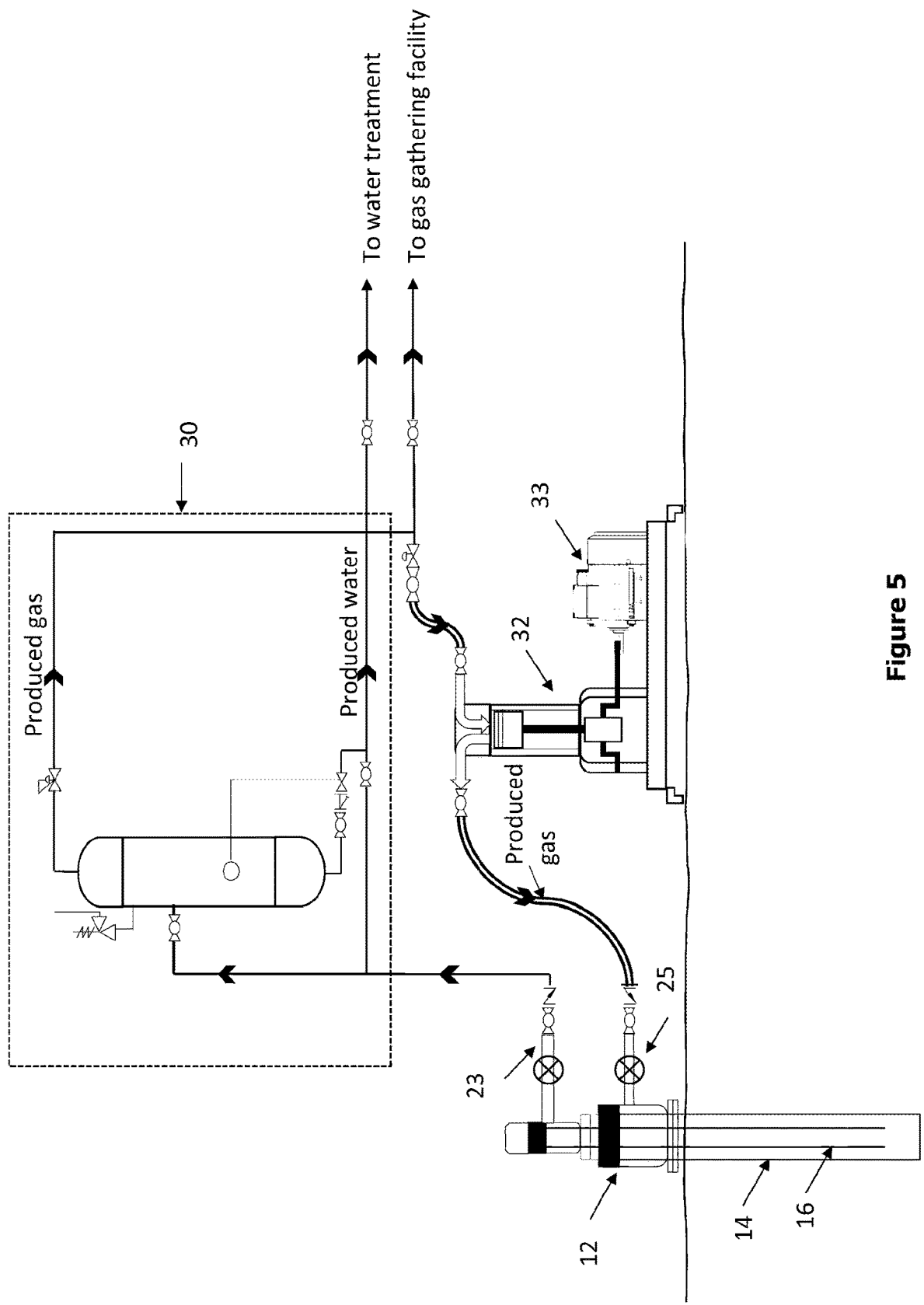
FIG. 5 is a schematic of the CSG well of FIG. 3 incorporating a dewatering system in accordance with an embodiment of the present invention.

With reference to FIG. 5, there is shown the CSG well of FIGS. 3 and 4 installed with a foam assisted gas lift dewatering system, in accordance with an embodiment of the present invention. The foam assisted gas lift dewatering system comprises a separating arrangement 30 and gas compressor 32.

The separating arrangement 30 is designed to receive a co-mingled solution or mixture or foam of produced water and gas from the wellhead 12 and then separates the solution/mixture into a liquid and a gas for further distribution. For example, the separating arrangement 30 may comprise a basic separation apparatus/vessel for degassing produced water, dewatering produced gas or separating a co-mingled solution or mixture. As shown in FIG. 5, the separating arrangement 30 is in fluid communication with the produced water outlet 23 of the wellhead 12. The separating arrangement 30 may be coupled to the water outlet 23 by way of any suitable pipe or flexible tubing.

A gas compressor 32 is located downstream of the separating arrangement 30 and is operable to receive a percentage of the separated produced gas through a control valve (pneumatic actuator, rotary control, pressure reducing or similar) with the main purpose being the ability to deliver a sufficient supply of gas at the pressure and flowrate demanded by the gas compressor to maintain optimum operational performance. The remaining portion of produced gas is routed to a gas gathering facility (not shown) for subsequent distribution. The gas compressor 32 may be any compressor suitable for compressing produced gas. For example, the gas compressor may be the D691, T891, T791, THG602 reciprocating industrial gas compressor models manufactured by Corken Inc. a part of the IDEX Energy Group (see URL http://www.corken.com) or the NG161, NG 162, NG163, NG172, NG173, NG361, NG362, NG363, NG372, NG373, NG602, NG603, NG612, NG613, NG642 and NG942 reciprocating gas compressor models manufactured by Blackmer, a part of the PSG Dover Company (see URL http://www.psgdover.com), or the range of LRG reciprocating gas compressor models manufactured by Leroi, a part of the Gardner Denver Group of companies (see URL http://leroigas.com/) or the range of QRNG reciprocating gas compressor models manufactured by Quincy Compressor (see URL https://www.quincycompressor.com/) . As the skilled person will understand, any suitable compressor may be used.

As an example the process configuration, the gas compressor 32 is operable to compress the portion of produced gas from initial suction pressures of 0 to 650 kPag (0 to 94.3 psig) and discharge pressures up to 10342 kPag (1500 psig) and flowrates of 8-891 Thousand Standard Cubic Feet per Day (MSCFD) for a particular installation. For a retro-fit operation, the motor 33 used to drive the gas compressor 32 may advantageously be the same motor 20 which was previously used for driving the pump drive head 21 (shown in FIG. 4) and will be sized against the gas compressor selected for the solution. Alternatively and in areas where there is no electric supply available, the option to include other drivers to power gas compressor 32 include a natural gas engine using produced gas generated by the dewatering process. The gas compressor 32 may include a controller which allows for the gas compressor to be monitored in a stand-alone configuration or remotely controlled through the client's Remote Telemetry Unit (RTU) systems. This control may involve monitoring of produced water flowrates, temperature of compressor discharge and pressure fluctuations necessary to maintain optimum operating parameters of the gas compressor as well as monitoring delivery of produced water and gas from the well. Monitoring and control instruments on the system, depending on system design, may include differential pressure, positive displacement, velocity and true-mass flow meters, and instruments for measurement of viscosity, density, turbidity and conductivity. Information may be transmitted via sensor back to the RTU system providing real-time updates to end users. RTU systems may either be existing (not shown) or can be supplied independently depending on requirements.

An outlet of the gas compressor 32 is fluidly coupled to the wellhead 12 for injecting gas into the production casing 14. For retro-fit applications, this may be achieved by coupling the gas compressor 32 outlet to the produced gas outlet 25 of the wellhead 12 (i.e. which was previously used with the PCP dewatering system for expelling produced gas). It will be understood that any form of coupling or valve configuration may be employed, provided that it allows for the compressed gas to be injected into the casing through the wellhead 12. Further suitable flexible hose couplings are used to connect the suction and discharge connections of the gas compressor 32 to reduce vibration produced by the gas compressor 32 during operation on any hard-piping installations. The gas compressor 32 configuration may be a stand-alone or multiple gas compressor arrangement tied-in to a central manifold depending on production demands. The connection between the flexible hose and the wellhead 12 connections are of the same size (ID) and pressure rating to prevent excessive pressure differentials across the gas compressor 32 suction and discharge ports and between the gas compressor 32 and the wellhead 12.

Operation of the dewatering system shown in FIG. 5 will now be described. In a first step the gas compressor 32 is turned on. During start-up, the CSG well may not be producing. This is as a result of water saturation which affects gas production flow rates and results in either a shortage or no produced gas to kick-off the dewatering process. In this case, an independent inert gas source (quad, bullet, etc.) will be introduced and tied in temporarily to the inlet manifold of the gas compressor 32 to prime the gas recirculation loop. As gas is produced from the coal seam, it is progressively released to the gas gathering system, according to the desired liquid: gas ratio required in the well.

The gas compressor 32 compresses and re-injects the gas into the CSG well 10 through the produced gas outlet 25. The reinjected gas is forced down the production casing 14 (or in other embodiments through a dedicated injection tube) to the gas injection point or points, in the example shown in FIG. 5, to a point where the end of the production tubing 16 is reached. Gas and liquid rise in the production tubing as co-mingled produced water and gas to the surface where it is expelled out of the produced water outlet 23 and transferred to the separation apparatus 30 where the solution is separated into produced water and gas. A percentage of the produced gas from the separator 30 may now be redirected back to the gas compressor 32 for gas reinjection, recirculation and subsequent dewatering process. Once the well 10 has started to produce sufficient produced gas for the dewatering operation, the inlet manifold on the gas compressor 32 is adjusted to run either a partial mixed gas composition (inert and produced gas) or isolated from the inert gas supply completely if the gas recirculation requirements are able to be met by the produced gas. Any inert gas introduced during the dewatering/re-injection process is combined with the produced gas and processed by the gas gathering facility. The RTU (remote terminal unit) may dynamically control the amount of gas being delivered to the gas compressor 32 based on the periodic requirements of the system, as determined by the gas compressor on-board sensors and production flow rate and pressure variables.

Figure 6:
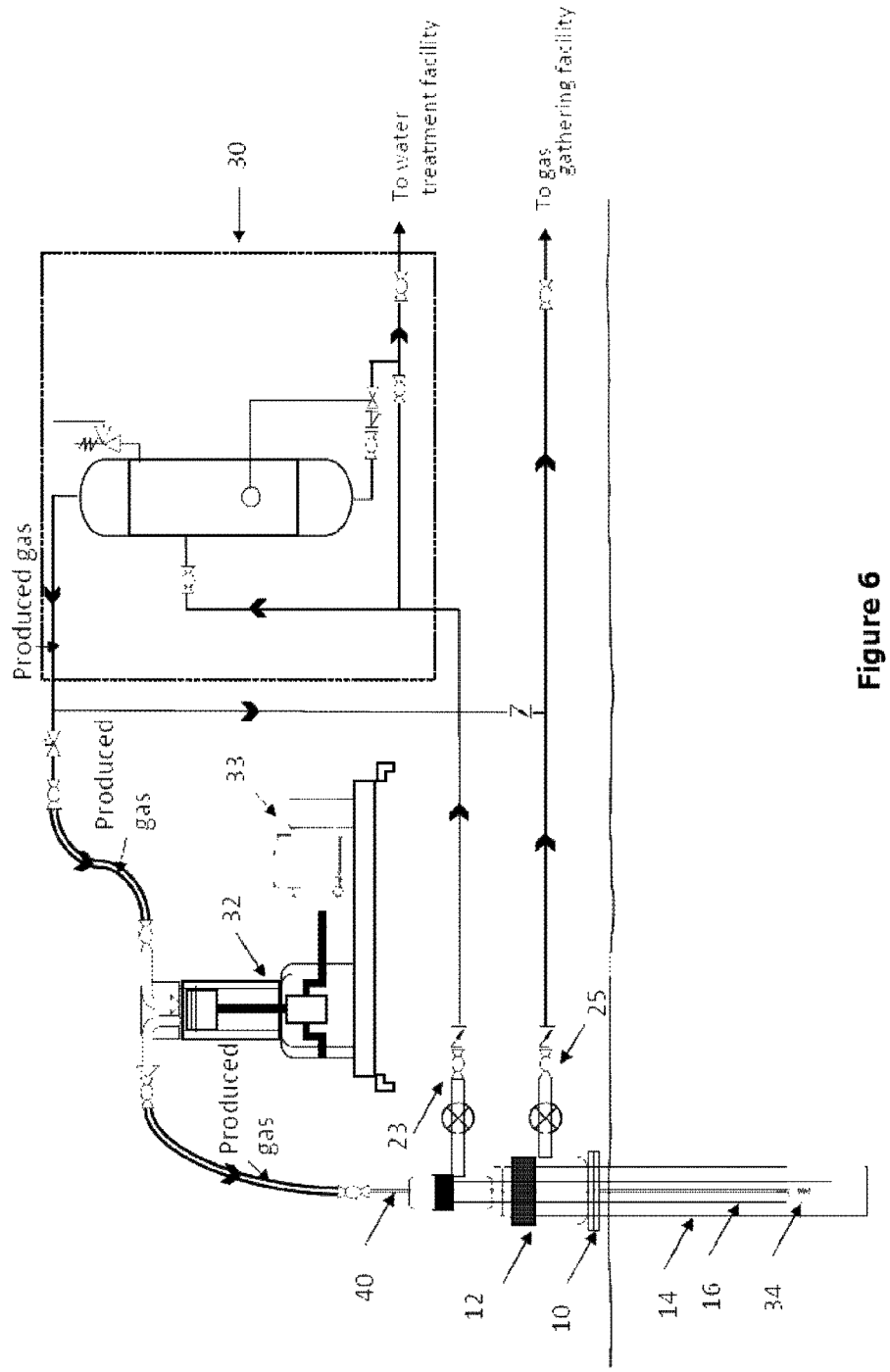
FIG. 6 is a schematic of the CSG well of FIG. 3 incorporating a dewatering system in accordance with an alternative embodiment of the present invention.

FIG. 6 shows an alternative configuration of the invention, still for use with a CSG well 10 as shown in FIG. 3. In this alternative configuration, a gas injection tube 40 is inserted inside the production tubing 16. For retro-fit applications, the PCP dewatering system is removed prior to installing the gas injection tube 40, which extends to the injection point or points in the vicinity of the open end of the production tubing 16. For new installations, the gas injection tube 40 extends the length of the production tubing 16. The top of the gas injection tube 40 may be securely fastened to the wellhead 12 top connector.

As shown in FIG. 6, the outlet of the gas compressor 32 is in fluid communication with the gas injection tube 40 for reinjecting compressed produced gas through the gas injection tubing 40 to the down-hole outlet of the gas injection tube 40 located within the production tubing 16. The produced water outlet 23 is coupled to the separating arrangement 30 for solution separation as afore-described. The produced gas separated from the produced water as part of the separation process is recycled and reinjected by the gas compressor 32, there is expected to be minimal loss of produced gas as a result of this recirculation/reinjection process. All produced gas received through the produced gas outlet and passed to the gas gathering facility.

Operation of the dewatering system shown in FIG. 6 will now be described. In a first step the gas compressor 32 is turned on. Again, during start up, an inlet of the gas compressor may be connected to a gas source independent of the CSG well 10 (which may be producing little or no gas due to water saturation). Once the well 10 has started to produce, the gas compressor 32 inlet may be adjusted for receiving produced gas from the separating apparatus 30. The gas compressor 32 reinjects the produced gas back into the CSG well 10 through the gas injection tubing 40 located within the production tubing 16. This process reduces the hydrostatic fluid column pressure causing the co-mingled solution/mixture to move up the production tubing to the wellhead 12 where it is expelled out of the produced water outlet 23 and directed to the separating apparatus 30. This process in turn causes produced water and gas to move towards the production casing and production tubing for extraction as part of the natural migration process associated with dewatering of CSG wells. Separated produced water is output from the separating apparatus 30 to a water gathering facility via flow lines for further processing (not shown). A percentage of the produced gas from the separator is fed back to the gas compressor 32 sufficient to maintain optimum operational conditions. CSG produced as a result of the process is carried up the well casing 14 where it is expelled through the produced gas outlet 25. This produced gas and the excess gas along with the excess separated gas is delivered to the gas gathering facility through flow lines (not shown) for further distribution. Again, the RTU and control unit may dynamically control the amount of gas being delivered to the gas compressor 32 based on the periodic requirements of the system.

Figure 7:
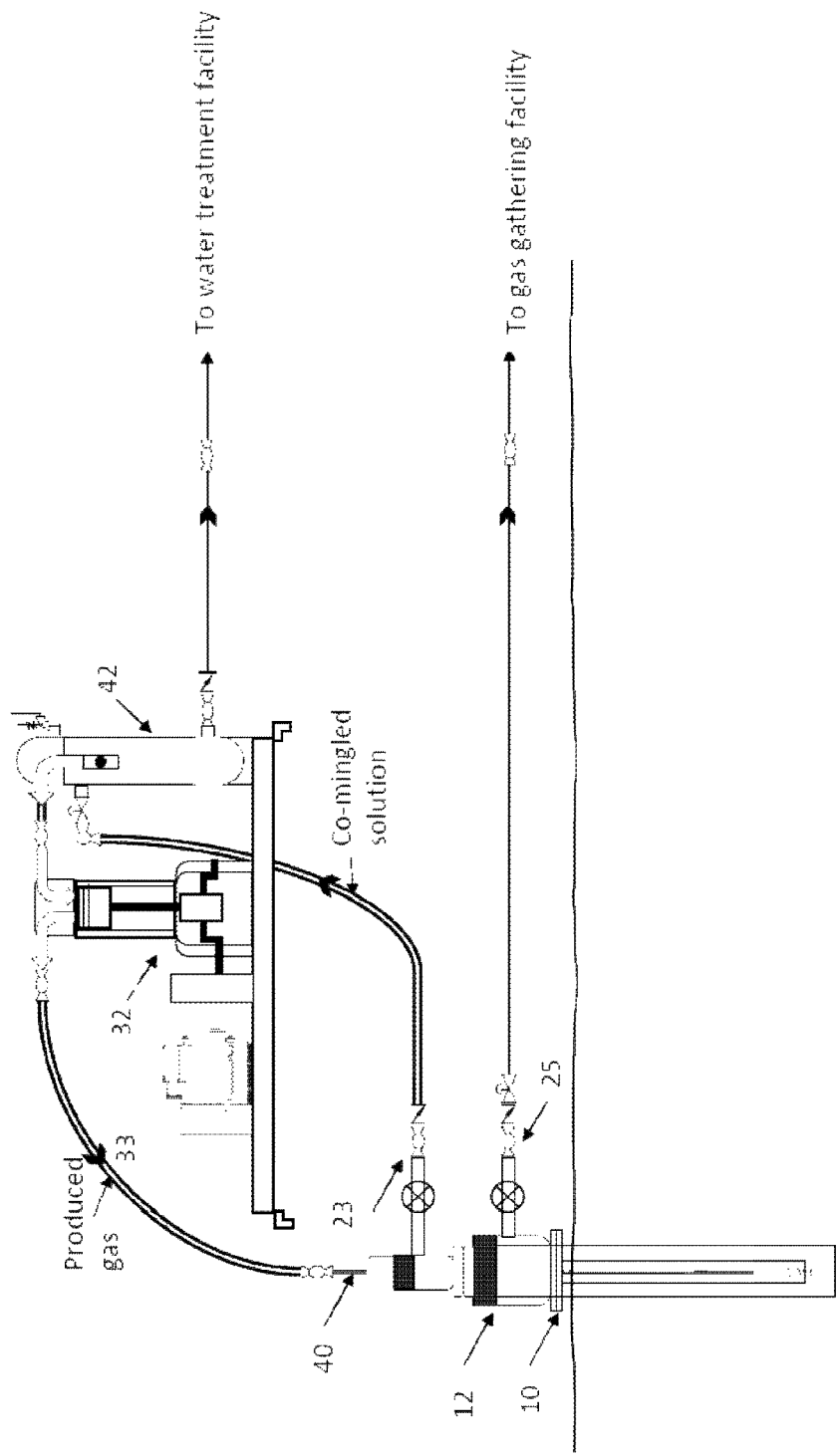
FIG. 7 is a schematic of the CSG well of FIG. 3 incorporating a dewatering system similar to that of FIG. 4 with an alternative separating arrangement, in accordance with an embodiment of the present invention.

There remains the option in instances where there may not be a separating apparatus 30 to manage the separation of the co-mingled solution or mixture produced as a result of the dewatering process independently. FIG. 7 includes the basic layout of components identified in FIG. 6, namely the gas compressor 32 and the CSG well 10 arrangement with the addition of a liquid trap/knock-out drum 42 installed in-line with the gas compressor 32 (i.e. installed before the gas compressor 32 to perform separation requirements). In this alternative configuration, a liquid trap/knock-out drum 42 is included as part of the solution to ensure all produced water is removed from the dewatering/reinjection process before being routed back to the gas compressor 32 and gas gathering facility similarly described in FIG. 4 above. All produced water collected in the liquid trap/knock-out drum will be routed back to the water gathering facility as afore described.

Figure 8:
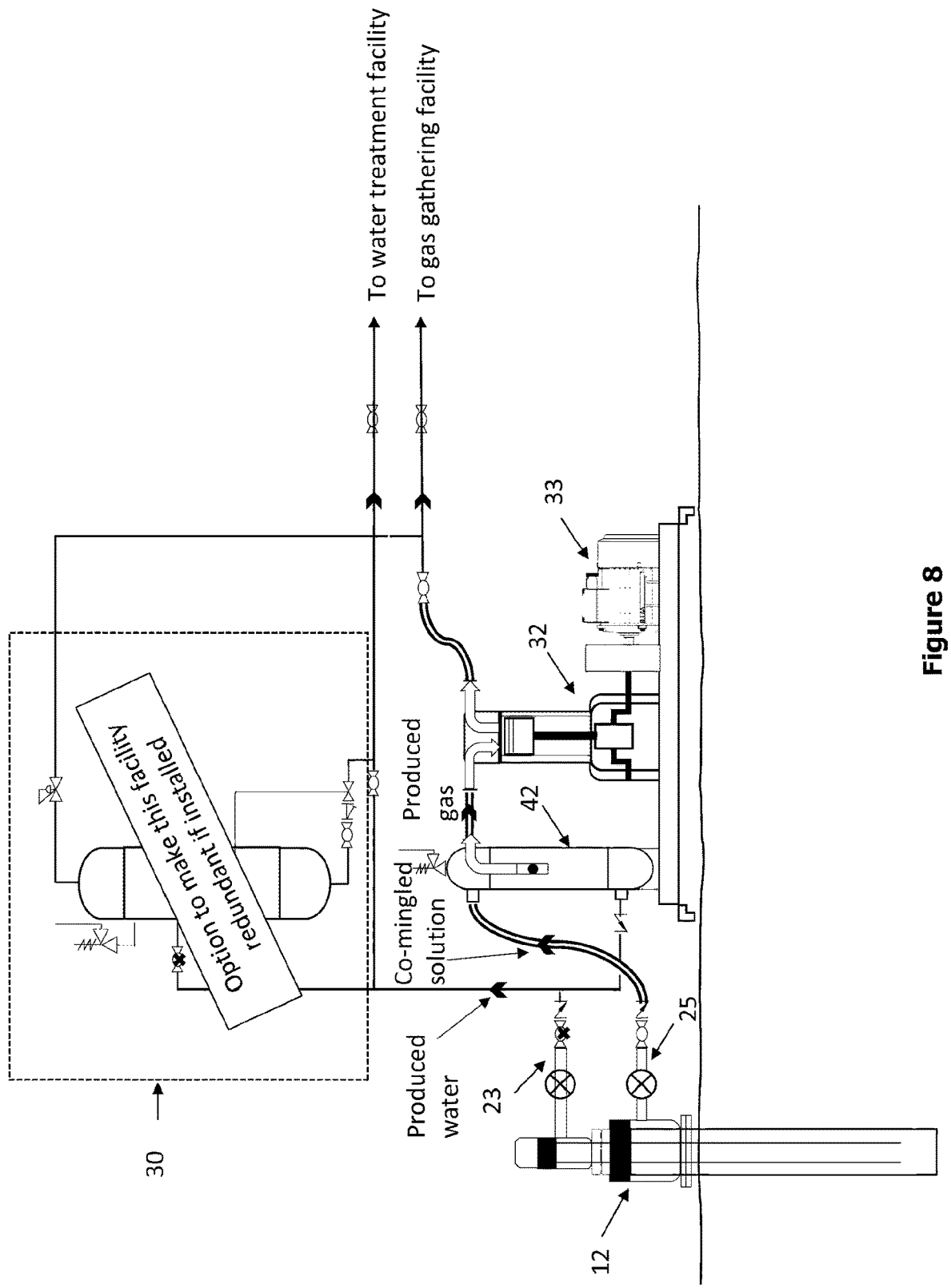
FIG. 8 is a schematic of the CSG well of FIG. 3 incorporating a gas flow optimising system in accordance with yet another alternative embodiment of the present invention.

For all the embodiments shown in FIGS. 5, 6 and 7, once the CSG well 10 has been sufficiently dewatered, the gas compressor 32 may be reconfigured so as to extract produced gas from the CSG well 10 to improve gas flow optimisation. Such a re-configuration is shown in FIG. 8, where the gas compressor 32 is coupled to the wellhead 12 with a flip over of the coupled hoses to the gas compressor 32 inlet (suction) and outlet (discharge) valves. There may be both a single stage (i.e. for high pressure wells) and two stage (i.e. for lower pressure wells) compression, depending on the well characteristics and stage of well lifecycle. As in FIG. 7 a water knock-out drum/liquid trap 42 is installed between the wellhead 12 and the gas compressor 32 for preventing any produced water from entering the gas compressor 32.

Embodiments of the present invention have minimal hardware requirements and ease of implementation and operation. There are no subsurface moving parts required and the energy requirement to operate the system may be low. Solids from the CSG well will typically present no problems and indeed may even be beneficial in stabilising the foam. Using methane as the gas to form the foam is also advantageous in that recycled production gas may be used as the pressurised methane that is used to generate the foam. Further, injection of additional methane into the well is unlikely to increase safety risks, as could occur if air was injected into the well. The injected methane will also have no effect on downstream processing facilities for processing or treating the recovered gas.

Coal seam gas underpins Australia's energy future, both domestically as a cleaner transitional source of energy that will replace coal for the coming decades, and for export as LNG, set to become Australia's second largest foreign currency earner. Typical pump life for the progressive cavity pumps most widely used in current CSG wells is around 18 months and failures require the well to be shut in, maintenance crews deployed to recover and replace the pump, with attendant economic, safety and environmental costs. Further, even with operating bottom hole pumps, the flow regime in the well may carry water up rather than down, resulting in performance problems at the wellhead. Embodiments of the present invention, in not requiring mechanical lift pumps and the associated pump strings at the bottom of the well, has the potential to reduce the capital cost involved in establishing a CSG well. The present invention may also be used in conjunction with mechanical lift pumps in current CSG wells to reduce the pumping requirements of the mechanical lift pumps and reducing pump degradation due to fines interference and thereby extend the working life of those pumps. In addition, the well itself may be considerably simplified by removing the need for double piping, no drive-string or subsurface moving parts and increasing the cross-section available for productive flow, with associated capital cost savings. As pump strings are not necessarily required in new CSG pumps operated in accordance with the present invention, a smaller diameter well may be drilled, which leads to reduced drilling costs and reduced casing costs.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for removing water from a gas well, the gas well including an outer casing into which gas and water flow near the lower region of the gas well, the method comprising delivering pressurised methane into a lower region of the gas well, the pressurised methane acting to lift water from the lower region of the gas well, and cause it to flow upwards towards the surface, wherein delivery of the pressurised methane to the lower regions of the gas well acts to provide foam assisted gas lift and controlling well bottom hole pressure by mapping foam density.

2. The method as claimed in claim 1 wherein foam density is controlled by controlling the liquid to gas ratio in the well by adjusting the amount of pressurised methane that is delivered to the lower region of the well or by the use of additives.

3. The method as claimed in claim 2 wherein the ratio of liquid to gas, the L/G ratio, following methane injection into the well falls within the range of from 0.005 to 0.3.

4. The method as claimed in claim 3 wherein the ratio of liquid to gas, the L/G ratio, following methane injection into the well falls within the range of from 0.025 to 0.25.

5. The method as claimed in claim 1 further comprising measuring bottom hole pressure in the lower region of the well and controlling bottom hole pressure to a value within a desired range.

6. The method as claimed in claim 5 wherein bottom hole pressure is controlled by controlling a ratio of liquid to gas in the well or in the foam.

7. The method as claimed in claim 1 wherein one or more additives ar added in order to assist in forming a stable foam.

8. The method as claimed in claim 7 wherein the one or more additives comprises a salt or a salt solution.

9. The method as claimed in claim 8 wherein the one or more additives comprise a brine.

10. The method as claimed in claim 8 wherein the one or more additives comprise one or more surfactants.

11. The method as claimed in claim 8 wherein solid fines or solid particulates are raised from the lower region of the well and the solid fines or solid particulates act as a stabilising component of the foam and also assist in maintaining a stable foam in the column of the gas well.

12. The method as claimed in claim 1 wherein as the methane expands as it rises up the column or bore of the well, a foam is formed and foam flow causes the combined fluid density to be reduced as the gas-liquid mixture approached the surface.

13. The method as claimed in claim 1 wherein the solid fines and solid particulates are raised to the surface and are separated from the gas and liquid fractions at the surface using solid separation technology.

14. The method as claimed in claim 1 wherein the water is separated from the methane at the surface and the methane that is separated from the water comprises methane that has been delivered into the gas well and methane produced in the gas well.

15. The method as cloaimed in claim 1 wherein at least part of the methane that is separated from the water is returned to the lower region of the gas well as pressurised methane.

16. The method as claimed in claim 1 wherein the gas well includes inner tubing water is removed by foam assisted gas lift through the annulus between the outer casing and the inner tubing.

17. The method as claimed in claim 16 wherein the inner tubing is used in conjunction with a mechanical lift pump.

18. The method as claimed claim 1 wherein the gas well comprises an outer casing with no inner tubing.

19. The method as claimed in claim 1 wherein pressurised methane is delivered into the gas well via a tube or pipe that extends to the gas injection position or positions in the lower region of the gas well.

20. The method as claimed in claim 1 wherein pressurised methane is provided by passing methane to a compressor and increasing pressure of the methane in the compressor, and subsequently delivering the pressurised methane to the lower region of the gas well.

21. The method as claimed in claim 1 wherein pressurised methane is delivered to a region that is located below a level of water accumulated in the lower region of the gas well.

22. The method as claimed in claim 1 wherein the method further includes the step of separating the water from the gas at the surface.

23. The method as claimed in claim 22 wherein once the gas has been separated from the liquid, it is sent to a gas storage tank, a gas treaatment process or to a gas delivery pipeline and at least part of the gas that is separated from the liquid is fed to the compressor so that it can be pressurised and delivered to the lower region of the well.

24. The method as claimed in claim 22 wherein a plurality of gas wells provide the gas-liquid mixture or gas-liquid-solids mixture to separation equipment in which the solids and liquids are separated from the gas, and some of the gas is provided to a compressor and the compressor delivers pressurised methane to at least some or all of the plurality of gas wells, wherein control of the flow rate of methane that is delivered to each of the gas wells is achieved by providing a control valve in each pipeline that connects each gas well to the compressor.

25. The method as claimed in claim 22 wherein separation equipment is provided at the surface and the separation equipment receives the gas-liquid mixture or gas-liquids-solids mixture from a plurality of gas wells.

26. The method as claimed in claim 1 wherein the gas well comprises a coal seam gas well or a shale gas well.

* * * * *